United States Patent
Keller et al.

(10) Patent No.: US 9,056,307 B2
(45) Date of Patent: Jun. 16, 2015

(54) CATALYST

(71) Applicant: Heraeus Materials Technology GmbH & Co. KG, Hanau (DE)

(72) Inventors: Thorsten Keller, Darmstadt (DE); Uwe Jantsch, Freigericht (DE); Claude Georges Jacques Paul Lambert, Saint-Witz (FR)

(73) Assignee: Heraeus Deutschland GmbH & Co. KG, Hanau (DE)

( * ) Notice: Subject to any disclaimer, the term of this patent is extended or adjusted under 35 U.S.C. 154(b) by 65 days.

(21) Appl. No.: 13/949,311

(22) Filed: Jul. 24, 2013

(65) Prior Publication Data
US 2014/0031201 A1  Jan. 30, 2014

(30) Foreign Application Priority Data

Jul. 24, 2012  (DE) .................. 10 2012 106 732
Jul. 12, 2013  (EP) ..................... 13176242

(51) Int. Cl.
| | |
|---|---|
| *B01J 35/06* | (2006.01) |
| *B01J 23/46* | (2006.01) |
| *B01J 23/42* | (2006.01) |
| *C01B 21/26* | (2006.01) |
| *C01C 3/02* | (2006.01) |

(52) U.S. Cl.
CPC ............... *B01J 23/464* (2013.01); *B01J 23/42* (2013.01); *B01J 35/06* (2013.01); *C01B 21/265* (2013.01); *C01C 3/0216* (2013.01)

(58) Field of Classification Search
CPC ........... B01J 23/40; B01J 35/04; B01J 35/06; D04B 1/14; D03D 15/00
USPC ............. 502/339, 527, 24; 442/6, 208, 304
See application file for complete search history.

(56) References Cited

U.S. PATENT DOCUMENTS

| | | | | |
|---|---|---|---|---|
| 2,274,684 | A * | 3/1942 | Goodloe ................... | 55/520 |
| 3,993,600 | A * | 11/1976 | Hunter ..................... | 502/314 |
| 4,375,426 | A * | 3/1983 | Knapton et al. .......... | 502/325 |
| 4,435,373 | A * | 3/1984 | Knapton et al. .......... | 423/403 |
| 4,869,891 | A * | 9/1989 | Handley ................... | 423/403 |

(Continued)

FOREIGN PATENT DOCUMENTS

| | | |
|---|---|---|
| DE | 60201502 T2 | 11/2005 |
| GB | 337680 A | 11/1930 |

(Continued)

OTHER PUBLICATIONS

Office Action issued Apr. 30, 2013 in DE Application No. 10 2012 106 732.5.
Office Action issued Aug. 29, 2014 in U.S. Appl. No. 13/949,430 by Keller.

*Primary Examiner* — Colleen Dunn
(74) *Attorney, Agent, or Firm* — Panitch Schwarze Belisario & Nadel LLP

(57) ABSTRACT

A catalyst comprising a plurality of catalyst gauzes that are arranged in series is provided. Each catalyst gauze is made of a first noble-metal-containing wire and a second noble-metal-containing wire which is embedded in the catalyst gauze and which gives the catalyst gauze a preferential direction. The catalyst gauzes according to the invention are arranged in series such that the angles between the preferential directions of neighboring catalyst gauzes are between 0° and 180°. The catalyst ensures a product yield that is reproducible over time and has a long service life.

8 Claims, 4 Drawing Sheets

(56) References Cited

U.S. PATENT DOCUMENTS

| | | | |
|---|---|---|---|
| 5,188,813 A * | 2/1993 | Fairey et al. | 423/403 |
| 5,699,680 A | 12/1997 | Guerlet et al. | |
| 6,073,467 A * | 6/2000 | Blass et al. | 66/170 |
| 2002/0127932 A1 * | 9/2002 | Neumann et al. | 442/6 |
| 2014/0031202 A1 | 1/2014 | Keller et al. | |

FOREIGN PATENT DOCUMENTS

| | | |
|---|---|---|
| WO | 2004047983 A1 | 6/2004 |
| WO | 2004096703 A2 | 11/2004 |

* cited by examiner

US 9,056,307 B2

CATALYST

BACKGROUND OF THE INVENTION

The present invention relates to a catalyst containing catalyst gauzes made of noble metal. Such noble-metal catalysts are used, in particular, for gas reactions, such as in the manufacture of hydrocyanic acid according to the Andrussow process and in the manufacture of nitric acid according to the Ostwald process. In order to provide large catalytically active surfaces for these reactions, such catalysts usually have spatial gas-permeable structures.

Often, these noble-metal catalysts consist of catalyst gauzes which are designed, for example, in the form of weft- or warp-knitted or woven fabrics made of noble-metal wire. In addition to the bending strength, the ultimate tensile strength, and the ductility of the noble-metal wires, the wire diameter also plays a role in limiting the geometric shape of the catalyst gauze. Noble-metal wires having diameters ranging from 50 to 120 µm and ultimate tensile strengths ranging from 900 to 1050 $N/mm^2$ are the only ones suitable, for example, for knitting wires of specific platinum-rhodium, platinum-palladium-rhodium, palladium-nickel, palladium-copper and palladium-nickel-copper alloys.

As a result of these properties of noble-metal wires, other structural catalyst properties, such as the catalyst mass per surface unit and the number of meshes per surface unit, are also defined within certain limits. For this reason, the reaction process to be catalyzed may only be optimized to a limited extent by means of these structural catalyst properties.

To provide for better adjustment of these structural catalyst properties in known catalyst gauzes, U.S. Pat. No. 5,669,680 proposes incorporating a plurality of noble-metal wires having a helical, spiral-like structure into the meshes during the manufacture of the catalyst gauzes. Such a process extends the planar two-dimensional gauze into the third spatial dimension. These gauzes are, therefore, also referred to as "three-dimensional gauzes." Due to the helical structure, it is, for example, possible to manipulate both the active catalyst surface and the mass of the catalyst per surface unit via the thickness of the incorporated wire or via the number of spirals of the helical structure. The incorporated wires also facilitate the manufacture of heavy three-dimensional gauze systems. As a general rule, the incorporated noble-metal wires extend linearly and in parallel to each other, thus also giving the catalyst gauze a preferential direction that is defined by their extension.

Usually, a plurality of catalyst gauzes are installed in the reaction zone of a flow reactor, and are often arranged in series. A flow reactor for catalytic oxidation of ammonia in which the catalyst is designed as a packing of a plurality of catalyst gauzes that extend in parallel to each other is known from DE 602 01 502 T2. The packing is arranged in the reaction zone in such a manner that the plane spread by the catalyst gauzes extends vertically to the flow direction of a fluid containing the reactants to be converted.

The arrangement of the catalyst packing extending transversely to the flow direction produces a flow resistance which, among other factors, depends on the porosity of the catalyst packing. While the period of application becomes longer, a decrease in porosity and an increase in flow resistance are often observed, whereby a uniform flow that is constant over time is prevented and a reproducible average product yield is impaired.

BRIEF SUMMARY OF THE INVENTION

The objective of the present invention is to provide a catalyst which ensures a high product yield that is stable over time and which, consequently, has a long service life. Specifically, the present invention relates to a catalyst comprising a plurality of catalyst gauzes that are arranged in series. Each catalyst gauze is made of a first noble-metal-containing wire and a second noble-metal-containing wire which is embedded in the catalyst gauze and which gives the catalyst gauze a preferential direction. The catalyst gauzes according to the invention are arranged in series such that the angles between the preferential directions of neighboring catalyst gauzes are between 0° and 180°.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
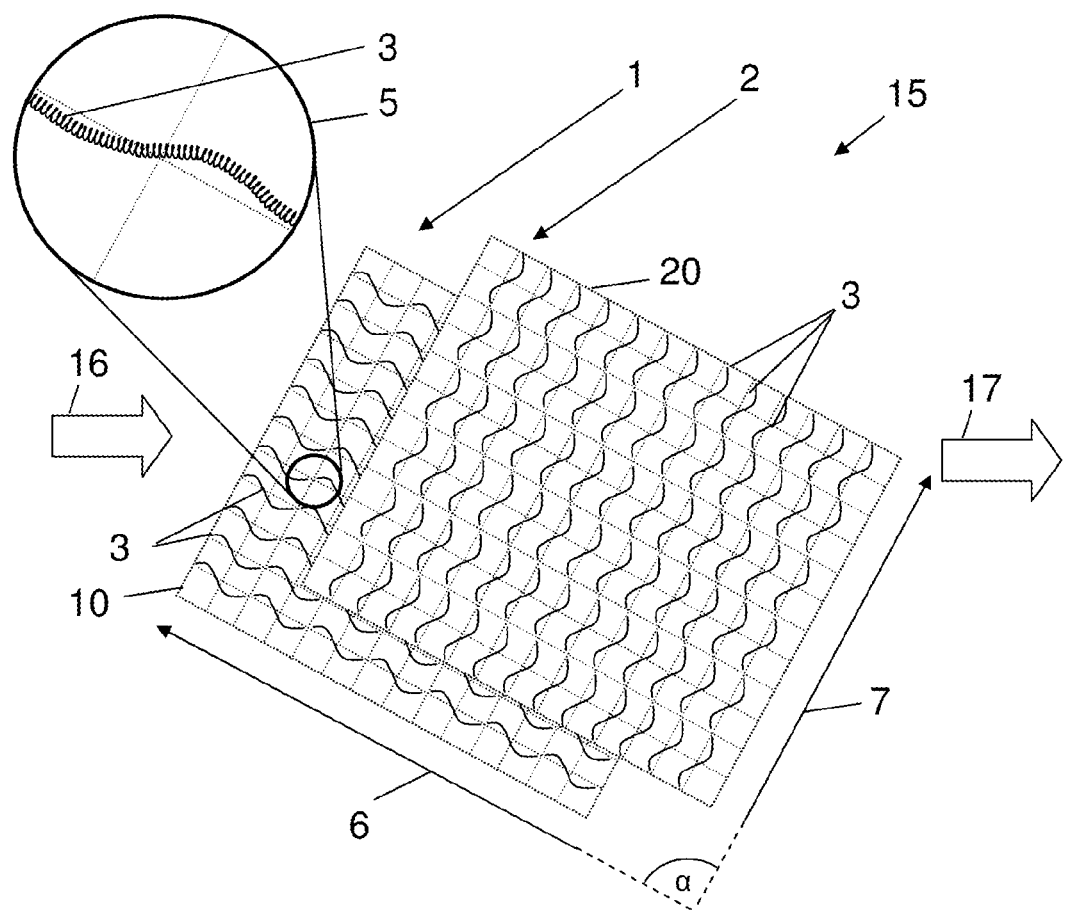
FIG. 1 is a schematic of a catalyst according to a first embodiment of the invention, in which neighboring catalyst gauzes are arranged in series with an orthogonally extending preferential direction.

Catalysts according to the invention contain a plurality of catalyst gauzes that are arranged in series. Each of the catalyst gauzes is made of a first noble-metal-containing wire and has a second noble-metal-containing wire embedded into the catalyst gauze. A "noble-metal-containing wire" or "noble-metal wire" may be understood to describe a wire which consists of a noble metal or contains a noteworthy content (>50 percent by weight) of a noble metal. The second noble-metal wire is embedded via a joint connection, preferably by sewing the second noble-metal wire to the catalyst gauze. As a result, the respective catalyst gauze acquires a three-dimensional structure. The embedded second wire provides the catalyst gauze with a preferential direction which extends in both directions along the longitudinal axis of the embedded second wire. The arrangement of a plurality of catalyst gauzes in series is also referred to as "catalyst packing"

The catalyst gauzes according to the invention are arranged in series such that the angles between the preferential directions of neighboring catalyst gauzes are between 0° and 180°. Thus, in contrast to known catalysts, the preferential directions in the catalysts according to the invention include an angle unequal to zero, also referred to as "angular-offset arrangement." Due to the offset arrangement of the catalyst gauzes, high mechanical stability of the catalyst packing is achieved. This stability is of particular importance when the catalyst gauzes are arranged transversely to the flow direction of a fluid flowing through the catalyst because the catalyst gauzes provide flow resistance. This results in the formation of a pressure upstream of the catalyst—as seen in flow direction—which leads to a compression of the catalyst gauzes or catalyst packing. As a result, the gap volume inside the catalyst packing is reduced. This gradually changes the flow of the fluid and affects the average product yield and the service life of the catalyst.

The fact that the angle between the preferential directions of neighboring catalyst gauzes may be unequal to zero counteracts compression of the catalyst gauzes. This is due to the fact that one of the causes for the increased compression of known catalyst gauzes with preferential directions that is observed under pressure load is their three-dimensional structure. As seen transversely to the preferential direction, each of the catalyst gauzes alternately has recesses and elevations. If the preferential directions of neighboring catalyst gauzes are arranged in parallel, these recesses and elevations extend in the same direction, with the result that a complementary arrangement of recesses and elevations of neighboring catalyst gauzes is promoted if a pressure is acting on the catalyst gauzes. Such a complementary arrangement results in a comparatively high compression of the catalyst gauzes, which is promoted by a continuous pressure load.

In contrast to a parallel alignment of the preferential directions, the formation of such a complementary structure of recesses and elevations of neighboring catalyst gauzes is complicated in an angular-offset arrangement. The increased mechanical stability of the catalyst packing thus obtained contributes to a prolonged service life of the catalyst according to the invention.

In a preferred embodiment of the invention, the second wire has at least one helically formed longitudinal section. The second wire may comprise one or a plurality of helically formed longitudinal sections or may be formed as a helically bent wire over its entire length. Due to the fact that the second wire contains at least one helically formed longitudinal section, both the active catalyst surface and the mass of the catalyst in relation to a surface unit of the catalyst gauze may be adjusted, for example, via the wire thickness or via the number of spirals of the helical longitudinal section. In a preferred embodiment, the second wire has a helical structure over its entire length. Due to its uniform structure, such a wire may be easily manufactured and processed. In a further preferred embodiment, the helically formed and the linear longitudinal sections of the second wire are alternating, with the result that the catalyst properties may be adjusted by appropriately selecting the length of the particular longitudinal section.

Compared with the longitudinal linear section, the helical longitudinal section has a more voluminous structure. When the preferential directions of neighboring catalyst gauzes are aligned in parallel, the helical longitudinal sections of neighboring catalyst gauzes also extend in the same direction, with the result that the latter can slide into each other, also producing a compression of the catalyst gauzes. If, however, the neighboring catalyst gauzes have an angular offset, this compression effect is reduced.

In a further preferred embodiment of the invention, the second wire is made of a platinum metal or of an alloy thereof. The term "platinum metal" includes platinum, iridium, osmium, ruthenium, rhodium, and palladium. Platinum metals are used as catalysts, for example, in the manufacture of nitric acid according to the Ostwald process and in the synthesis of hydrocyanic acid according to the Andrussow process. They have adequate ductility as well as sufficient bending strength and ultimate tensile strength to allow them to be processed to form catalyst gauzes in the form of weft- or warp-knitted or woven fabrics.

Due to the fact that it is made of a platinum metal or of an alloy thereof, the second wire has catalytic activity and is, over and above this, suitable for being embedded into the catalyst gauze because of its material properties.

Because the second wire is embedded into the catalyst gauze and should itself have catalytic activity if possible, a flexible noble-metal wire having a large surface is desirable. Since the flexibility and the surface of the wire depend on the wire diameter, thin wires are desirable as a general rule. It has therefore proven to be successful if the second wire has a wire diameter ranging from 40 μm to 100 μm. A second wire having a diameter of less than 40 μm can tear easily and is complex in its processing. On the other hand, wire diameters of more than 100 μm have low flexibility.

In a further preferred embodiment of the invention, the angle between the preferential directions of neighboring catalyst gauzes is between 45° and 135°, which ensures that the mechanical stability of the catalyst packing is particularly high.

In another particularly preferred embodiment of the invention, the preferential directions of neighboring catalyst gauzes extend orthogonally to each other. This arrangement facilitates a particularly effective mechanical stabilization of the catalyst packing. In addition, the catalyst may be manufactured easily and with a low loss in material. This benefit is particularly applicable if the catalyst gauzes have a square shape. In this case, the orthogonality of the preferential directions of neighboring catalyst gauzes may be achieved by mutual rotation without any loss of material at the edges.

It has proven to be advantageous if the first noble-metal-containing wire is made of the same material as the second wire. Due to the fact that the first and second wires are preferably made of the same material, the composition of both wires may be optimally adjusted to match the process to be catalyzed. In this case, both wires have an optimal catalytic activity.

With regard to maximizing the flexibility of the catalyst gauze made of the first noble-metal-containing wire, as well as to a surface of the noble metal that is preferably large for catalyst applications, the first noble-metal-containing wire used for the manufacture of the catalyst gauze is preferably as thin as possible. The first noble-metal containing wire preferably has a wire diameter ranging from 40 μm to 100 μm, more preferably from 50 μm to 80 μm.

In another preferred embodiment of the invention, a two-dimensional intermediate gauze that is made of a third noble-metal-containing wire is provided between neighboring catalyst gauzes. An intermediate gauze incorporated between neighboring catalyst gauzes additionally counteracts compression of neighboring catalyst gauzes under a pressure load. The intermediate gauze is a two-dimensional gauze which is, for example, manufactured by textile processing methods, such as weft- or warp-knitting or weaving of noble-metal-containing wires, and does not have any preferential direction. Preferably, the intermediate gauze also has catalytic activity. The intermediate gauze preferably has flexibility that is limited as compared with other gauzes. Preferably, the intermediate gauze has a mean mesh width ranging from 0.4 to 2.0 mm. An intermediate gauze having a mean mesh width of less than 0.4 mm generates a high gas resistance and therefore produces additional compression forces. Conversely, an intermediate gauze having a mean mesh width of more than 2 mm has only a comparatively small catalytically effective surface.

It has proven to be advantageous if the third noble-metal-containing wire is made of a platinum metal or of an alloy thereof and thus may also have catalytic activity. If the third noble-metal-containing wire is made of an alloy of a platinum metal, it preferably contains a noteworthy content (>50 percent by weight) of a platinum metal.

The flexibility of the intermediate gauze, for example, depends on the diameter of the intermediate gauze wire. In an advantageous embodiment of the catalyst according to the invention, the intermediate gauze wire has a diameter ranging from 30 μm to 100 μm. If the wire diameter is less than 30 μm, the stabilization effect of the intermediate gauze wears off. Conversely, an intermediate gauze having a wire diameter of more than 100 μm has a small catalytically effective surface and has only a low catalytic activity per weight of the noble metal used.

FIG. 1 is a schematic representation of a first embodiment of a catalyst 15 according to the invention, in which neighboring catalyst gauzes 1, 2 are arranged in series. The catalyst is suitable for the manufacture of hydrocyanic acid according to the Andrussow process. In the manufacture of hydrocyanic acid, a preheated gaseous ammonia-methane-air mixture flows through the catalyst. The flow direction extends vertically to the gauze plane and is indicated by arrows 16, 17.

The catalyst gauze 1 has a basic structure 10 in the form of a textile fabric which was made by machine-knitting metal wires. The warp-knitted fabric has meshes with a mean mesh width of 0.8 mm. The metal wires are made of a platinum-rhodium alloy (90/10) and have a diameter of 76 μm and a weight of 90.8 mg/m.

A plurality of flexible wires 3 are embedded into the two-dimensional basic structure 10 at regular spacings, with the result that a three-dimensional catalyst gauze 1 is obtained. The wires 3 are made of a platinum-rhodium alloy (90/10) and have a wire diameter of 76 μm and a weight of 90.8 mg/m. In addition, the wires 3 are bent in the form of a spiral over their entire length, as shown in the enlarged detail 5. The outer diameter of the spiral is, for example, 350 μm and the number of spirals is 3 per mm. The available wire surface may, for example, be adjusted via the number of spirals per unit length. The catalyst gauze 1 having wires 3 embedded into the basic structure 10 is particularly heavy.

The basic structure 20 of the catalyst gauze 2 is manufactured in the same way as the basic structure 10 of the catalyst gauze 1, with the result that it has the same physical and chemical properties. A plurality of helically bent wires 3 extending in parallel to each other are embedded into the basic structure 20. The chemical composition of the wires 3 corresponds to that of the basic structure 10.

Due to the fact that the wires 3 that are embedded into the respective basic structures 10, 20 extend in parallel to each other, the catalyst gauzes 1, 2 have a preferential direction which can extend in the direction of the wires 3 and in the opposite direction. The preferential directions 6, 7 are indicated by arrows in FIG. 1. As shown in FIG. 1, the neighboring catalyst gauzes 1, 2 are arranged such that the preferential directions 6, 7 extend orthogonally to each other ($\alpha=90°$).

Figure 2:
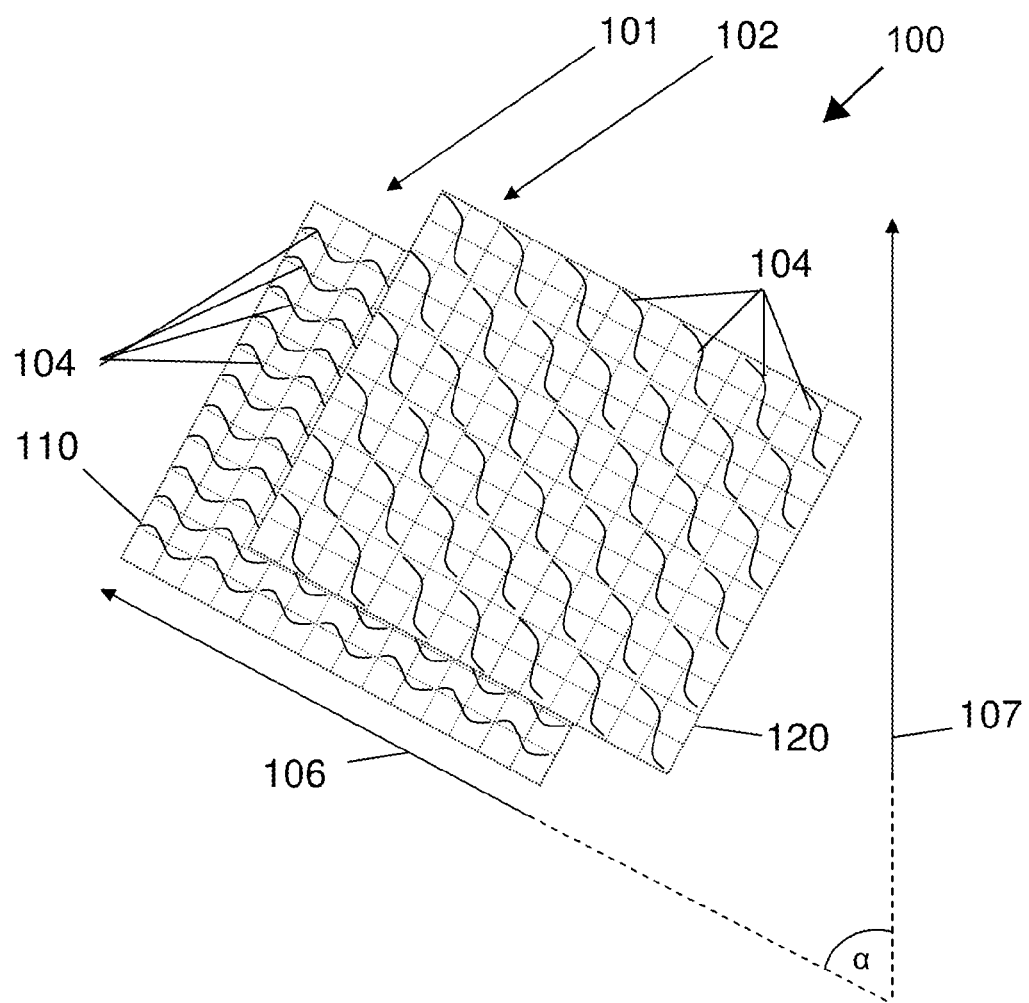
FIG. 2 is a schematic of a catalyst according to a second embodiment of the invention, in which neighboring catalyst gauzes are arranged in series with differing preferential directions.

A second embodiment of the invention is catalyst 100 comprising a plurality of catalyst gauzes that are arranged in series, as shown in FIG. 2. Catalyst 100 also comprises a plurality of catalyst gauzes. To simplify matters, FIG. 2 shows only two neighboring catalyst gauzes 101, 102. All neighboring catalyst gauzes of the catalyst are arranged in relation to each other as shown in FIG. 2.

The catalyst gauzes 101, 102 are based on the same basic structures 110, 120 which are manufactured by machine-knitting noble-metal-containing wires. Such noble-metal-containing wires are made of a PdNi5 alloy with a wire diameter of 80 μm. The weft-knitted fabric comprises meshes with a mean mesh width of 0.6 mm.

Noble-metal-containing wires 104, which are made of a palladium-nickel alloy (95/5), are embedded into the catalyst gauzes 101, 102. The noble-metal-containing wires 104 alternately have linear and helically bent longitudinal sections. The length of the linear longitudinal sections is, for example, approximately 5 mm while the length of the helically bent longitudinal sections is approximately 10 mm in their bent condition.

The two catalyst gauzes 101, 102 differ only in that the noble-metal-containing wires 104 are embedded into the basic structures 110, 120 in different directions. The embedded wires 104 give a preferential direction to each of the respective basic structures 110, 120. By way of example, the preferential directions 106, 107 are also indicated by arrows in FIG. 2. As shown in FIG. 2, neighboring catalyst gauzes 101, 102 are arranged in series such that an angle ($\alpha$) between the preferential directions 106, 107 is 63°.

Figure 3:
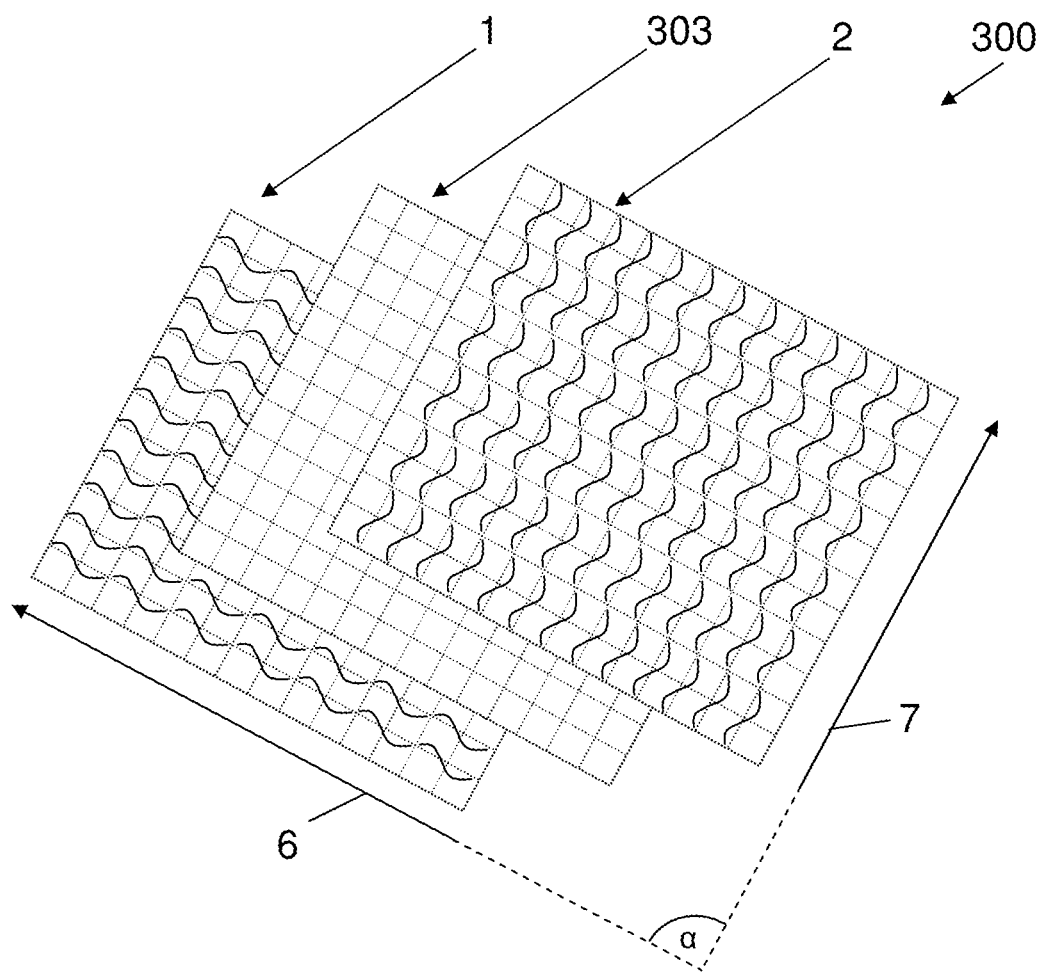
FIG. 3 is a schematic of a catalyst according to a further embodiment of the invention, in which an intermediate gauze is provided between neighboring catalyst gauzes having different preferential directions.

FIG. 3 shows catalyst 300 according to a further embodiment of the invention, in which an intermediate gauze 303 is provided between neighboring catalyst gauzes 1, 2. These catalyst gauzes correspond to the catalyst gauzes 1, 2 of FIG. 1 and are arranged such that their preferential directions 6, 7 extend vertically to each other. An intermediate gauze 300 which is made by machine-knitting a noble-metal-containing wire and which has a mean mesh width that is less than that of the two catalyst gauzes 1, 2 is arranged between catalyst gauzes 1, 2. Specifically, intermediate gauze 303 has a mean mesh width of approximately 0.5 mm. The noble-metal-containing intermediate gauze wire is made of a PtRh5Pd5 alloy and has a wire diameter of 50 μm.

Figure 4:
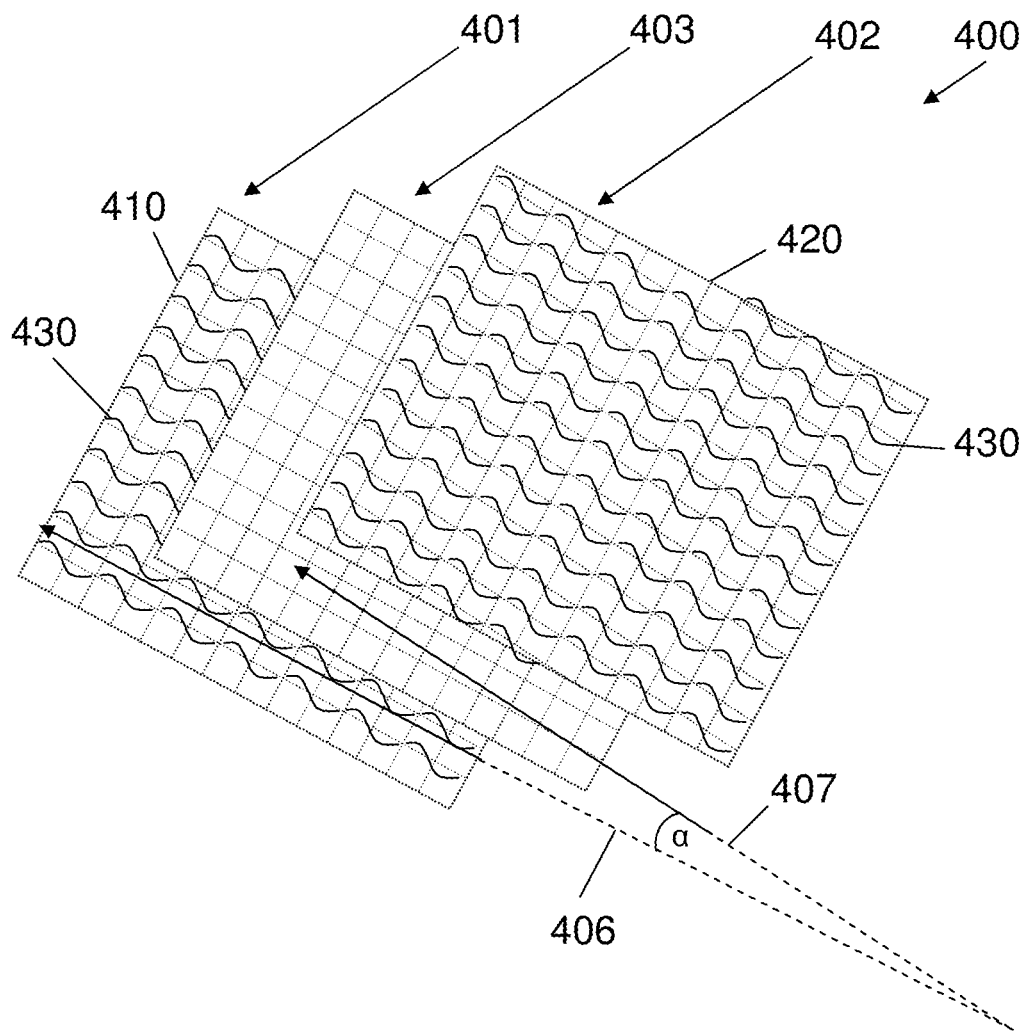
FIG. 4 is a schematic of a catalyst according to a further embodiment of the invention, in which an intermediate gauze is provided between neighboring catalyst gauzes having different preferential directions.

FIG. 4 shows a catalyst 400 according to a further embodiment of the invention. In this catalyst, an intermediate gauze 403 is provided between neighboring catalyst gauzes 401, 402. The catalyst gauzes 401, 402 are based on a two-dimensional basic structure 410, 420 in the form of a textile fabric which was made by machine-knitting noble-metal wires. The warp-knitted fabric has meshes with a mean mesh width of 1.0 mm. The metal wires are made of a PtRh alloy 95/5 and have a diameter of 61 μm and a weight of 60 mg/m. A plurality of flexible wires 430 are embedded into the two-dimensional basic structures 410, 420 at regular spacings, with the result that three-dimensional catalyst gauzes 401, 402 are obtained. The wires 430 are made of a PtRh alloy (90/10) and have a wire diameter of 70 μm and a weight of 77 mg/m.

The two neighboring catalyst gauzes 401, 402 are arranged such that their preferential directions 406, 407 extend at an angle ($\alpha$) of 6° in relation to each other. An intermediate gauze 403 made by machine-knitting a noble-metal-containing wire and having a mean mesh width of 0.8 mm is arranged between the two catalyst gauzes. The noble-metal-containing wire of the intermediate gauze 403 is made of a PtRh10 alloy and has a wire diameter of 76 μm.

Example

Compression tests were carried out in which a plurality of stacks each comprising 24 catalyst gauzes (L×W: 50 mm×50 mm) were subjected to a weight of 1 kg (weight force: 9.81 N) at an ambient temperature of 1,100° C. over a period of 3 days.

The catalyst gauzes were made of a PtRh10 wire having a wire diameter of 76 μm. A helically formed second wire made of PtRh10 was embedded into the catalyst gauzes. The wire diameter of the second wire was 76 μm. Table 1 summarizes the specific arrangements of the gauzes and the compression results that were measured. The values specified in the "Compression" column are relative to the initial stack height.

TABLE 1

| Arrangement of neighboring catalyst gauzes | Compression |
| --- | --- |
| Preferential directions: parallel ($\alpha = 0°$) | 40% |
| Preferential directions: offset diagonally ($\alpha = 45°$) | 38% |
| Preferential directions: offset orthogonally ($\alpha = 90°$) | 36% |
| Preferential directions: offset orthogonally with intermediate gauzes ($\alpha = 90°$) | 35% |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A catalyst comprising a plurality of catalyst gauzes arranged in series, wherein each catalyst gauze comprises a first noble-metal-containing wire and a second noble-metal-containing wire embedded in the catalyst gauze, the second wire comprises at least one helically formed longitudinal section and defines a preferential direction of the catalyst gauze, wherein the plurality of catalyst gauzes are arranged in series such that an angle between the preferential directions of neighboring catalyst gauzes is between 45° and 135°, and wherein the catalyst further comprises at least one two-dimensional intermediate gauze comprising a third noble-metal-containing wire, wherein the intermediate gauze is provided between neighboring catalyst gauzes.

2. The catalyst according to claim 1, wherein the second wire comprises a platinum metal or an alloy thereof.

3. The catalyst according to claim 1, wherein the second wire has a wire diameter of 40 µm to 100 µm.

4. The catalyst according to claim 1, wherein the preferential directions of neighboring catalyst gauzes extend orthogonally to one other.

5. The catalyst according to claim 1, wherein the first and second noble-metal-containing wires are made of the same material.

6. The catalyst according to claim 1, wherein the first wire has a wire diameter of 40 µm to 100 µm.

7. The catalyst according to claim 1, wherein the third noble-metal-containing wire comprises a platinum metal or an alloy thereof.

8. The catalyst according to claim 1, wherein the third wire has a wire diameter of 30 µm to 100 µm.

* * * * *